United States Patent
Bai et al.

(10) Patent No.: US 12,194,502 B2
(45) Date of Patent: Jan. 14, 2025

(54) PIECE PICKING SYSTEM

(71) Applicant: ZHEJIANG GALAXIS TECHNOLOGY GROUP CO., LTD., Jiaxing (CN)

(72) Inventors: Hongxing Bai, Jiaxing (CN); Yan Yang, Jiaxing (CN); Chunguang Gu, Jiaxing (CN); Lu Shen, Jiaxing (CN)

(73) Assignee: ZHEJIANG GALAXIS TECHNOLOGY GROUP CO., LTD., Jiaxing (CN)

( * ) Notice: Subject to any disclaimer, the term of this patent is extended or adjusted under 35 U.S.C. 154(b) by 176 days.

(21) Appl. No.: 17/786,549

(22) PCT Filed: Dec. 10, 2021

(86) PCT No.: PCT/CN2021/137195
§ 371 (c)(1),
(2) Date: Jun. 17, 2022

(87) PCT Pub. No.: WO2022/135185
PCT Pub. Date: Jun. 30, 2022

(65) Prior Publication Data
US 2023/0044586 A1    Feb. 9, 2023

(30) Foreign Application Priority Data

Dec. 22, 2020    (CN) .......................... 202023126405.X (51) Int. Cl.
*B07C 3/08* (2006.01)
*B07C 5/36* (2006.01)
(Continued)

(52) U.S. Cl.
CPC .................. *B07C 3/08* (2013.01); *B07C 5/36* (2013.01); *B65G 37/02* (2013.01); *B65G 47/42* (2013.01)

(58) Field of Classification Search
CPC .. B07C 3/08; B07C 5/36; B65G 37/02; B65G 47/42; B65G 47/96; B65G 2201/0285;
(Continued)

(56) References Cited

U.S. PATENT DOCUMENTS

| 8,113,334 B2 * | 2/2012 | Layne ..................... B07C 3/008 |
| | | 198/457.03 |
| 2019/0060959 A1 * | 2/2019 | Imazuka .............. B65G 11/203 |
| | | (Continued) |

FOREIGN PATENT DOCUMENTS

| CN | 104590840 A | 5/2015 |
| CN | 105217204 A | 1/2016 |
| | (Continued) | |

*Primary Examiner* — Gene O Crawford
*Assistant Examiner* — Abby A Jorgensen
(74) *Attorney, Agent, or Firm* — Bayramoglu Law Offices LLC (57) ABSTRACT

A piece picking system includes at least one main conveyor unit and a plurality of sorting modules. The at least one main conveyor unit and the plurality of sorting modules are arranged crosswise in a matrix, and the at least one main conveyor unit is located above or below the plurality of sorting modules. A plurality of picking stations are arranged at a side of each main conveyor unit, and are adjacent to each of the sorting modules. The main conveyor unit is configured to convey a first container carrying an item to be picked. The picking station is configured to pick the item in a required quantity from the first container conveyed by the main conveyor unit according to an order requirement. The sorting module is configured to sort the item picked by the adjacent picking station. The system aggregates the sorting capabilities of the plurality of sorting modules.

19 Claims, 4 Drawing Sheets

(51) Int. Cl.
*B65G 37/02* (2006.01)
*B65G 47/42* (2006.01)

(58) Field of Classification Search
CPC ........ B65G 47/52; B65G 47/69; B65G 47/70;
B65G 47/90; G06Q 10/08
See application file for complete search history.

(56) References Cited

U.S. PATENT DOCUMENTS

| | | | |
|---|---|---|---|
| 2020/0269283 A1* | 8/2020 | Ulrich | B07C 3/008 |
| 2021/0009362 A1* | 1/2021 | Grupp | B07C 3/08 |
| 2021/0039140 A1* | 2/2021 | Geyer | B07C 5/18 |
| 2021/0276047 A1* | 9/2021 | Kincaid | B65G 47/82 |

FOREIGN PATENT DOCUMENTS

| | | | | |
|---|---|---|---|---|
| CN | 108584410 A | * | 9/2018 | ............... B07C 3/08 |
| CN | 208495002 U | | 2/2019 | |
| CN | 208576789 U | | 3/2019 | |
| CN | 109689536 A | | 4/2019 | |
| CN | 109954683 A | | 7/2019 | |
| CN | 110510315 A | * | 11/2019 | ............ B07C 3/008 |
| CN | 111415122 A | | 7/2020 | |
| CN | 113469631 A | | 10/2021 | |
| EP | 2384825 A1 | * | 11/2011 | ............... B07C 3/08 |
| WO | 2015195420 A1 | | 12/2015 | |
| WO | WO-2017051089 A1 | * | 3/2017 | ............... B07C 3/02 |
| WO | WO-2018200503 A1 | * | 11/2018 | ............... B07C 1/04 |

\* cited by examiner

PIECE PICKING SYSTEM

CROSS-REFERENCE TO THE RELATED APPLICATIONS

This application is the national phase entry of international Application No. PCT/CN2021/137195, filed on Dec. 10, 2021, which is based upon and claims priority to Chinese Patent Application No. 202023126405.X, filed on Dec. 22, 2020, the entire contents of which are incorporated herein by reference.

TECHNICAL FIELD

The present application relates to the technical field of logistics, and in particular to a piece picking system.

BACKGROUND

At present, the multi-variety, multi-order processing is faced with major technical difficulties. In particular, thousands of varieties are involved in thousands of orders per day, hundreds of thousands of varieties are involved in each order, and the millions of order lines need to be consolidated into thousands of cases. This type of processing difficulty is unprecedented.

The logistics volume of this magnitude occurs in the e-commerce industry and the express delivery industry, which have simple technical requirements. The e-commerce industry has multiple varieties and multiple orders, but a single order consists of a small number of varieties, so a batch of orders can be completed once a variety is outbound, and a large number of orders can be bagged or loaded on a small number of lines. Since there is no requirement for combination of items, the consolidated picking method is commonly used to solve the problem of picking and sorting. Similar to the e-commerce industry, in the express delivery industry, millions of parcels are sorted, unpacked and packed according to the line. Since the parcels do not need to be associated with other parcels, high-speed sorters are often used. During sorting and packing, the parcels are independent in circulation in the warehouse.

When each order involves hundreds of varieties, if the items of millions of order lines are cross-docked to tens of thousands of order containers using the consolidated picking method, the transfer route is extremely complicated and the overall sorting efficiency is low. If the high-speed sorters are used to sort the items of millions of order lines per day into tens of thousands of order containers, there are too many destinations. Even with the fastest cross-belt sorters, the handling volumes are very large and the overall sorting efficiency is low. Therefore, the existing piece picking system has the problems of complex structure, large footprint and low overall sorting efficiency.

SUMMARY

An objective of the present application is to provide a piece picking system, which has the advantages of simple structure, small footprint and high overall sorting efficiency.

An embodiment of the present application provides a piece picking system. The piece picking system includes at least one main conveyor unit and a plurality of sorting modules, where the at least one main conveyor unit and the plurality of sorting modules are arranged crosswise in a matrix, and the at least one main conveyor unit is located above or below the plurality of sorting modules; a plurality of picking stations are arranged at a side of each main conveyor unit, and are adjacent to each of the sorting modules; the main conveyor unit is configured to convey a first container carrying an item to be picked; the picking station is configured to pick the item in a required quantity from the first container conveyed by the main conveyor unit according to an order requirement; and the sorting module is configured to sort the item picked by the adjacent picking station.

In an embodiment of the present application; the main conveyor unit may include a main conveyor line and a staging line; the staging line may be located at one or two sides of the main conveyor line; the first container may be transferred to the staging line for the picking station to pick the item in the required quantity; and a second container carrying a remaining item after picking may be staged on the staging line or transferred to the main conveyor line to be taken away.

In an embodiment of the present application, the main conveyor unit may be provided with a lateral transfer device, and the lateral transfer device may be configured to transfer the first container and the second container between the main conveyor line and the staging line.

In an embodiment of the present application, the piece picking system further may include an auxiliary conveyor line, and the auxiliary conveyor line may be configured to carry an emptied container away from the piece picking system.

In an embodiment of the present application, the picking station may include an electronic display screen, and the electronic display screen may be configured to display information of the item to be picked, such that a picker picks the item in the required quantity.

In an embodiment of the present application, the picking station may include a manipulator connected to a host computer, and the manipulator may be configured to pick the item in the required quantity according to a picking instruction issued by the host computer.

In an embodiment of the present application, a transfer conveyor for transferring the item may be provided at an adjoining position of the picking station and the sorting module.

In an embodiment of the present application, the sorting module may include a sorting track, a sorting cart and a plurality of bins; an order container corresponding to an order may be placed in each bin; and the sorting cart moves on the sorting track to receive the item transferred from the picking station and dispatch the item to the order container of the corresponding bin.

In an embodiment of the present application, the sorting track may be a circular sorting track, and the circular sorting track may be provided with a chute connected to the corresponding bin; the sorting cart circulates on the circular sorting track; and when the sorting cart carries the item to the corresponding bin, the item may be slid into the order container of the corresponding bin through the chute at the corresponding bin.

In an embodiment of the present application, the sorting module may be located below the main conveyor unit; and a long side of the circular sorting track crosses the main conveyor unit.

In an embodiment of the present application, the piece picking system further may include a pick-up conveyor line and at least one transfer device; and the transfer device may be configured to transfer a fulfilled order container to the pick-up conveyor line, and transport an empty order container to a vacant bin.

In an embodiment of the present application, the piece picking system further may include at least one automated guided transfer device, and the automated guided transfer device may be configured to take away a fulfilled order container, and transport an empty order container to a vacant bin.

In an embodiment of the present application, the piece picking system further may include at least one first flow rack; and a third container carrying a fragile item to be sorted may be transported to the first flow rack for manual sorting by a picker.

In an embodiment of the present application, the piece picking system further may include at least one second flow rack; and an abnormal fulfilled order container may be transferred to the second flow rack for manual adjustment by a picker.

The piece picking system provided by the embodiment of the present application includes at least one main conveyor unit and a plurality of sorting modules. The at least one main conveyor unit and the plurality of sorting modules are arranged crosswise in a matrix, and the at least one main conveyor unit is located above or below the plurality of sorting modules. A plurality of picking stations are arranged at a side of each main conveyor unit, and are adjacent to each of the sorting modules. The main conveyor unit is configured to convey a first container carrying an item to be picked. The picking station is configured to pick the item in a required quantity from the first container conveyed by the main conveyor unit according to an order requirement. The sorting module is configured to sort the item picked by the adjacent picking station. The piece picking system provided by the embodiment of the present application adopts a matrix-type crosswise arrangement in combination with a consolidated picking method. the plurality of sorting modules can share tens of thousands of orders, reducing the number of orders per sorting module, and reducing the pressure of outbound sorting. The piece picking system has a simple overall structure and small footprint. Each sorting module is adjacent to a plurality of picking stations, such that the order lines picked by the picking stations do not need cross-docking, and the sorting route of the order line is simple. The design aggregates the sorting capabilities of the plurality of sorting modules, improving the overall sorting efficiency.

BRIEF DESCRIPTION OF THE DRAWINGS

To describe the technical solutions in the specific implementations of the present disclosure or the prior art more clearly, the drawings required for describing the specific implementations or the prior art are briefly described below. Apparently, the drawings in the following description show merely some implementations of the present disclosure, and those of ordinary skill in the art may still derive other drawings from these drawings without creative efforts.

Reference Numerals: 11. main conveyor line; 12. auxiliary conveyor line; 13. staging line; 2. picking station; 21. transfer conveyor; 23. electronic display screen; 31. circular sorting device; 311. sorting cart; 312, chute; 313. bin; 314. order container; 4, transfer device; pick-up conveyor line; 6. manual sorting zone; and 61. flow rack.

DETAILED DESCRIPTION OF THE EMBODIMENTS

The following clearly and completely describes the technical solutions of the present disclosure with reference to the embodiments. Apparently, the described embodiments are merely some rather than all of the embodiments of the present disclosure. All other embodiments obtained by those of ordinary skill in the art based on the embodiments of this application without creative efforts should fall within the protection scope of this application.

The existing piece picking system has the problems of complex structure, large footprint and low overall sorting efficiency. In view of this, the present application provides a piece picking system, which has the advantages of simple structure, small footprint and high overall sorting efficiency.

In order to facilitate the understanding of the embodiment of the present application, the piece picking system provided by the embodiment of the present application is described in detail below.

An embodiment of the present application provides a piece picking system suited for any product. In practical application, it can be applied to boxed items, palletized items and flexible packaged items, etc., and can be used in any industry that requires piece picking, such as medicine, food, and clothing.

The piece picking system provided by the embodiment of the present application includes at least one main conveyor unit and a plurality of sorting modules. The at least one main conveyor unit and the plurality of sorting modules are arranged crosswise in a matrix, and the at least one main conveyor unit is located above or below the plurality of sorting modules. A plurality of picking stations are arranged at a side of each main conveyor unit, and are adjacent to each of the sorting modules. The main conveyor unit is configured to convey a first container carrying an item to be picked. The picking station is configured to pick the item in a required quantity from the first container conveyed by the main conveyor unit according to an order requirement. The sorting module is configured to sort the item picked by the adjacent picking station.

The piece picking system provided by the embodiment of the present application adopts a matrix-type crosswise arrangement in combination with a consolidated picking method. the plurality of sorting modules can share tens of thousands of orders, reducing the number of orders per sorting module, and reducing the pressure of outbound sorting. The piece picking system has a simple overall structure and small footprint. Each sorting module is adjacent to a plurality of picking stations, such that the order lines picked by the picking stations do not need cross-docking, and the sorting route of the order line is simple. The design aggregates the sorting capabilities of the plurality of sorting modules, improving the overall sorting efficiency.

In some possible embodiments, as shown in FIGS. 1 to 4, the main conveyor unit includes a main conveyor line 11 and a staging line 13. The main conveyor line 11 is located above the sorting modules, and the main conveyor line 11 is configured to convey the first container carrying the items to be picked. The staging line 13 is located at one or two sides of the main conveyor line 11. The first container on the main conveyor line 11 can be transferred to the staging line 13 for the picking station 2 to pick an item in a required quantity. A second container carrying a remaining item after picking is staged on the staging line 13 or transferred to the main conveyor line 11 to be taken away. The main conveyor line 11 is further configured to convey the second container carrying the remaining item and take away an empty container.

As shown in FIGS. 1 to 4, there are two main conveyor lines 11 arranged side by side and two staging lines 13 arranged side by side at two sides of the main conveyor line 11, and the staging lines 13 are only located close to the picking stations 2. However, it should be noted that in practical application, the number of the main conveyor lines 11, the number and position of the staging lines 13 can be set according to the requirements for the sorting efficiency and throughput.

In some possible embodiments, the main conveyor unit is provided with a lateral transfer device, and the lateral transfer device is configured to transfer the first container and the second container between the main conveyor line 11 and the staging line 13. The lateral transfer device may be provided on the main conveyor line 11 and/or the staging line 13. The lateral transfer device may be any material transfer device known to those skilled in the art, such as a balance wheel, a slider, a roller, etc., which can change the direction of conveying on the conveyor line.

In some possible embodiments, as shown in FIGS. 1 to 4, the piece picking system further includes an auxiliary conveyor line 12, and the auxiliary conveyor line 12 is configured to carry an emptied container away from the piece picking system. In practical application, the emptied containers like totes and pallets enter the main conveyor line 11 to loop back into the warehouse, and the emptied containers like cartons enter the auxiliary conveyor line 12 for collection.

Figure 4:
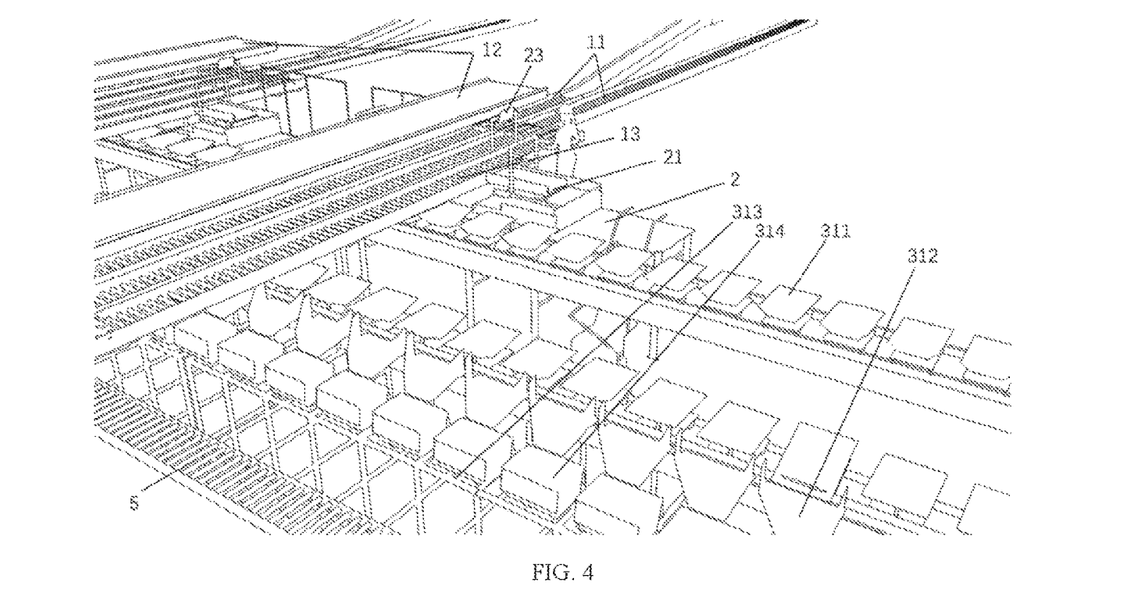
FIG. 4 is a partial three-dimensional view of the piece picking system according to an embodiment of the present application.

Optionally, as shown in FIG. 4, the auxiliary conveyor line 12 may be located above the main conveyor unit.

In a possible implementation, the picking station 2 adopts manual picking. As shown in FIG. 4, the picking station 2 includes an electronic display screen 23, and the electronic display screen 23 is configured to display information of the item to be picked for the picker to pick the item in a required quantity. The information of the items to be picked may include the variety and quantity of the items to be picked, and the picker can pick the items according to the variety, quantity and other information displayed on the electronic display screen 23.

In another possible implementation, the picking station 2 adopts manipulator picking. The picking station 2 includes a manipulator connected to a host computer, and the manipulator is configured to pick an item in a required quantity according to a picking instruction issued by the host computer. When the manipulator is picking, no display screen 23 is needed. The manipulator executes a control instruction (i.e. picking instruction) issued by the host computer, and the control instruction includes, for example, the number of picking actions and the picking quantity.

Figure 1:
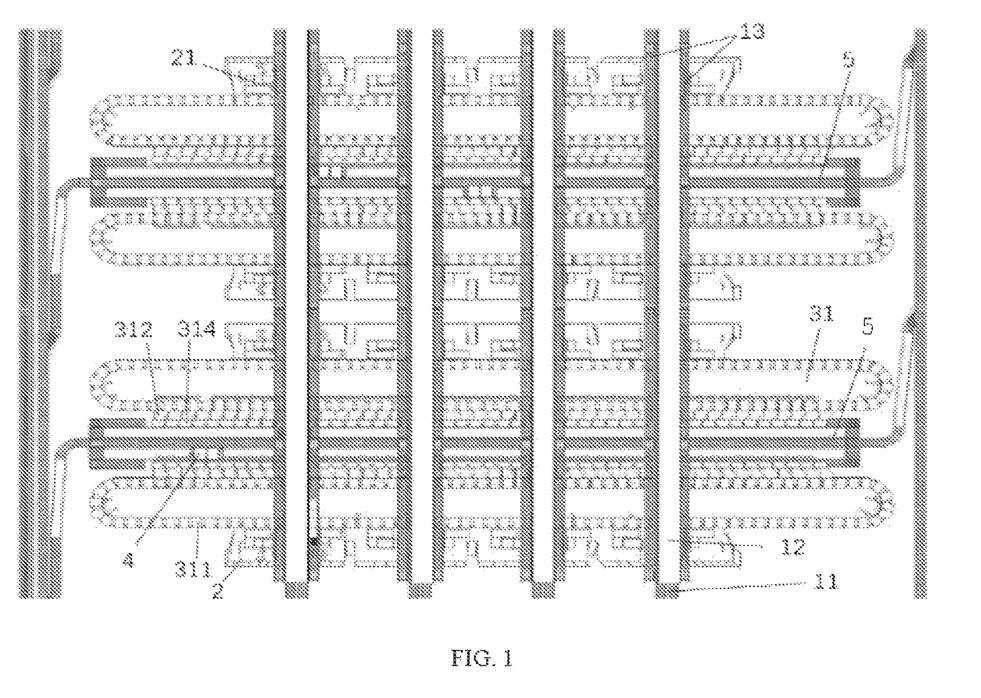
FIG. 1 is a top view of a piece picking system according to an embodiment of the present application.
Figure 2:
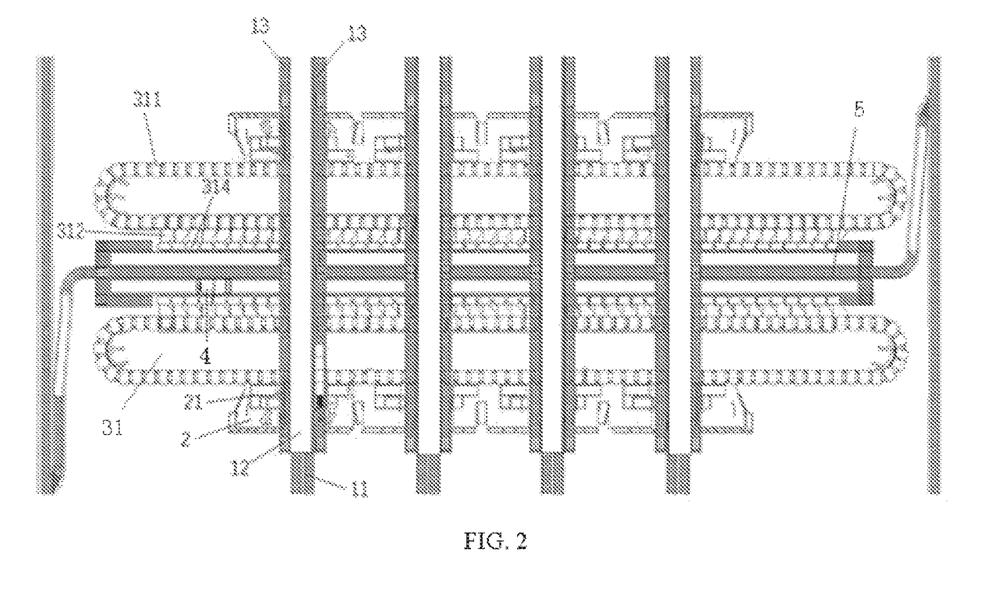
FIG. 2 is a partial top view of the piece picking system according to an embodiment of the present application.

In some possible embodiments, as shown in FIGS. 1, 2 and 4, a transfer conveyor 21 for transferring the item is provided at an adjoining position of the picking station 2 and the sorting module. The transfer conveyor 21 may be a conveyor known to those skilled in the art, such as a belt conveyor and a roller conveyor, which are able to convey items.

In some possible embodiments, the sorting module includes a sorting device and a take-away device. The sorting device is configured to sort the items picked by the picking station 2 into a designated position or a designated container. The take-away device is configured to take away the items sorted by the sorting device according to the order. As shown in FIGS. 1 to 4, the sorting device includes a sorting track, a sorting cart 311 and a plurality of bins 313. An order container 314 corresponding to an order is placed in each bin 313. The sorting cart 311 moves on the sorting track. The sorting cart 311 is configured to receive the items transferred from the picking station 2 and dispatch the items to the order container 314 of the corresponding bin 313. The take-away device is configured to take the order-sorted item and the order container 314 away.

Figure 3:
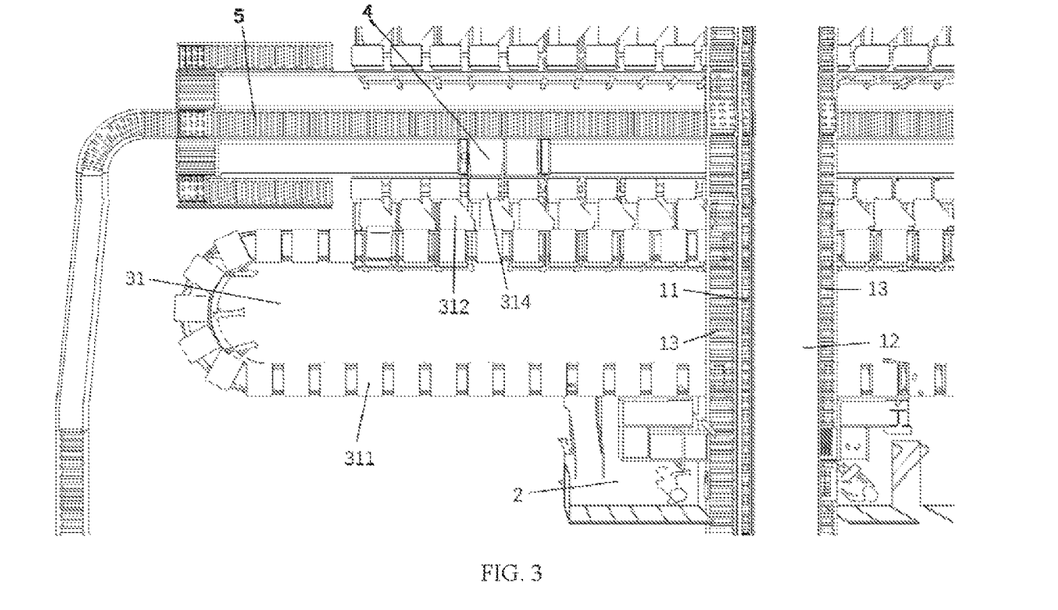
FIG. 3 is a partial enlarged view of the piece picking system according to an embodiment of the present application.

Optionally, as shown in FIGS. 1 to 3, the sorting device is a circular sorting device 31, and the sorting track is a circular sorting track. The picked item is transferred between the picking station 2 and the circular sorting device 31 via the transfer conveyor 21. The item picked manually or by a manipulator is placed on the transfer conveyor 21, and the item is transferred to the sorting cart 311 of the circular sorting device 31 by the transfer conveyor 21. As shown in FIG. 4, the circular sorting track is provided with a chute 312 connected to the corresponding bin 313. The sorting cart 311 circulates on the circular sorting track. When the sorting cart 311 loaded with the item moves to the corresponding bin 313, the item is slid into the order container 314 of the corresponding bin 313 through the chute 312 at the corresponding bin 313. Each order container 314 corresponds to one order, and one order may involve a plurality of varieties of items. When the multi-variety items required by an order are all picked and placed into the order container 314, the picking of the order is completed. The order container 314 is in a fulfilled state, and thus the order container 314 is referred to as a fulfilled order container.

The circular sorting device 31 may adopt cross-belt sorting, tray sliding, and tray reversal, etc. It should be noted that although the sorting track in this embodiment is a circular sorting track, in practical application, the sorting track may have any shape and may be a linear reciprocating sorting track, which is not limited herein.

For the fulfilled order container 314, there are a plurality of take-away methods, and the embodiment of the present application provides the following two optional take-away methods:

Method 1: The take-away device in the piece picking system includes a pick-up conveyor line 5 and at least one transfer device 4. The transfer device 4 is configured to transfer the fulfilled order container 314 to the pick-up conveyor line 5, and transport an empty order container 314 to the bin 313 lacking the order container 314. The transfer device 4 may be a shuttle vehicle, and an automated guided vehicle (AGV), etc. When the transfer device 4 is a shuttle vehicle, a shuttle track is provided between the pick-up conveyor line 5 and the bin 313.

Method 2: The take-away device in the piece picking system includes at least one automated, guided transfer device, and the automated guided transfer device is configured to take away the fulfilled order container 314, and to convey an empty order container 314 to the bin 313 lacking the order container 314. The automated guided transfer device may be an AGV It should be noted that the above two take-away methods are only examples, and the protection scope of the present application is not limited thereto.

Regarding the filling of the empty order container 314, in a possible embodiment, the empty order container 314 is transported by the pick-up conveyor line 5 to the transfer device 4 that accepts the task of filling the order container. The transfer device 4 picks up the empty order container 314 from the pick-up conveyor line 5 and transports it to the bin 313 lacking the order container 314. In another possible implementation, a temporary storage location for the empty order container is provided in a certain idle position. When the automated guided transfer device receives an empty order container filling task, the automated guided transfer device removes the empty order container 314 from the temporary storage location of the empty order container 314 to perform filling.

In an implementation, as shown in FIGS. 1 and 2, the piece picking system includes a plurality of main conveyor lines 11 and a plurality of circular sorting devices 31. the plurality of main conveyor lines 11 and the plurality of circular sorting devices 31 are arranged crosswise. For example, the main conveyor line 11 is arranged vertically, and the picked items are placed on the circular sorting device 31 and then taken away laterally for sorting. The picking station 2 is provided at a crossing of the main conveyor line 11 and the circular sorting device 31. In this way, the items to be sorted can reach any circular sorting device 31 through any main conveyor line 11. That is, each variety of items to be picked supplied by each main conveyor line 11 can be sorted to any position of any circular sorting device 31 or any order container 314. The design greatly improves the picking efficiency and easiness.

In some possible embodiments, as shown in FIG. 4, from a top view, the sorting module is located below the main conveyor unit, and a long side of the circular sorting track crosses the main conveyor unit. As shown in FIGS. 2 and 3, in an implementation, two long sides of the circular sorting device 31 in the loop line cross the main conveyor line 11. Among them, one long side is provided with the chute 312 and the bin 313, and the other long side is only provided with the picking station 2 at the crossing with the main conveyor line 11. For two adjacent circular sorting devices 31, a first long side of one circular sorting device 31 provided with the chute 312 and the bin 313 is adjacent to a second long side of the other circular sorting device 31 provided with the chute 312 and the bin 313. The pick-up conveyor line 5 is provided between the first long side and the second long side. That is, the two adjacent circular sorting devices 31 share one pick-up conveyor line 5.

Considering that the items to be sorted may be fragile products, in some possible embodiments, the piece picking system further includes at least one first flow rack. A third container carrying the fragile items to be sorted is transported to the first flow rack for manual sorting by a picker. The fragile products to be sorted do not enter the main conveyor unit, but directly enter the first flow rack for manual sorting.

Considering that the order container may not be able to be automatically closed and sealed after picking, in some possible embodiments, the piece picking system further includes at least one second flow rack, and an abnormal fulfilled order container 314 is transferred to the second flow rack for manual adjustment by a picker. The abnormal order container is, for example, an order container 314 that cannot be automatically closed due to the fact that the items exceed an opening of the container. The abnormal order container enters the second flow rack, and is manually adjusted, closed, and labeled.

It should be noted that the first flow rack and the second flow rack may be different flow racks, or may be the same flow rack. That is, the third container carrying the fragile items to be sorted and the abnormal order container may appear on the same flow rack. As a result, the picker can perform both fragile sorting and abnormal order container sorting on the same flow rack.

Figure 5:
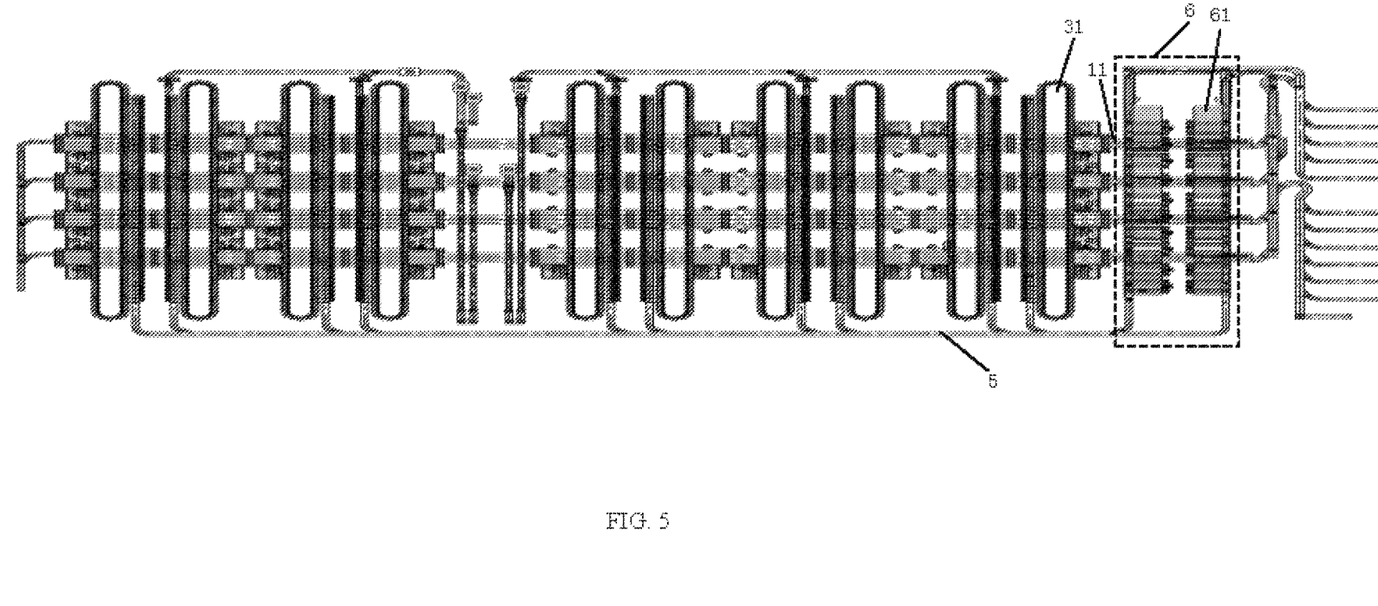
FIG. 5 is a top view of another piece picking system according to an embodiment of the present application.

In a possible implementation manner, as shown in FIG. 5, the piece picking system is provided with a manual sorting zone 6. The manual sorting zone 6 is provided with a plurality of flow racks 61. The flow rack 61 serves as the first flow rack and also serves as the second flow rack. Specifically, the flow rack 61 is also known as a first-in first-out (FIFO) rack, also known as a sliding rack. A plurality of outbound lines of a three-dimensional warehouse are respectively connected to each flow rack 61 and each main conveyor line 11. The pick-up conveyor line 5 passes through the zone where the flow rack 61 is located (i.e. the manual sorting zone 6). The first container carrying the general item to be picked enters the main conveyor line 11 from the outbound line of the three-dimensional warehouse, and the third container carrying the fragile item to be sorted enters the flow rack 61 from the outbound line of the three-dimensional warehouse for manual sorting. The transfer device may also be provided on the flow rack 61 to transfer the abnormal order container on the pick-up conveyor line 5 to the flow rack 61 for manual adjustment, closing and sealing.

To sum up, the piece picking system provided by the embodiment of the present application has a simple overall structure and a small footprint. The piece picking system aggregates the sorting capabilities of a plurality of sorting modules and improves the overall sorting efficiency. Meanwhile, the piece picking system balances the flow of each main conveyor line, and realizes the picking of fragile items and the adjustment of abnormal order containers.

Figure 6:
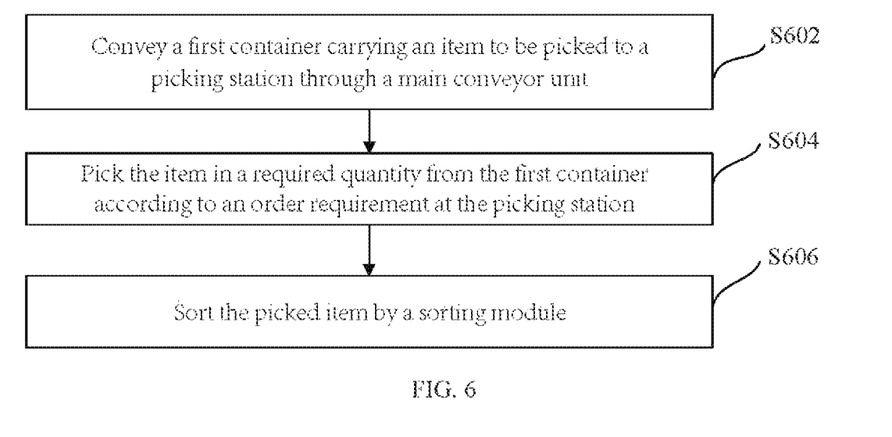
FIG. 6 is a flowchart view of a piece picking method according to an embodiment of the present application.

In order to facilitate the understanding of the work flow of the piece picking system, an embodiment of the present application further provides a piece picking method, which is applied to the piece picking system. FIG. 6 shows the flowchart of the piece picking method. As shown in the figure, the method mainly includes steps S602 to S606:

S602: Convey the first container carrying an item to be picked to the picking station through the main conveyor unit.

S604: Pick the item in a required quantity from the first container according to an order requirement at the picking station.

S606: Sort the picked item by the sorting module.

The piece picking method provided by the embodiment of the present application adopts a matrix-type crosswise arrangement in combination with a consolidated picking method. the plurality of sorting modules can share tens of thousands of orders, reducing the number of orders per sorting module, and reducing the pressure of outbound sorting. The piece picking system has a simple overall structure and small footprint. Each sorting module is adjacent to a plurality of picking stations, such that the order lines picked by the picking stations do not need cross-docking, and the sorting route of the order line is simple. The design aggregates the sorting capabilities of the plurality of sorting modules, improving the overall sorting efficiency.

Further, the main conveyor unit includes a main conveyor line and a staging line. After step S606, the method further includes: stage the second container carrying remaining items on the staging line or take the second container carrying remaining items away through the main conveyor line.

In some possible embodiments, for each variety of items, the item in a required quantity are picked a plurality of times from the first container at the picking station according to the requirements of a plurality of orders, and the plurality of picked items enter the sorting module for sorting in sequence. For example, when a variety of items is transported by the main conveyor line to the vicinity of the picking station, if there are a plurality of orders requiring different quantities of the items, the items are picked a plurality of times at the picking station according to the demands of the different orders. After picking, the items of the quantity required by the order are sorted to a preset position of the order.

In some possible embodiments, the method further includes a scan code review process. The scan code review process may be set after picking at the picking station and before entering the sorting module, or after the sorting module completes sorting and before the sorted items are taken away, or after the sorted items are taken away. Based on this, the method further includes: perform scan code review at a preset time point, where the preset time point includes after picking at the picking station and before entering the sorting module, or after the sorting module completes sorting and before the sorted items are taken away, or after the sorted items are taken away.

It should be noted that similar reference signs and letters represent similar items in the drawings below. Therefore, once an item is defined in one drawing, it does not need to be further defined and described in subsequent drawings.

In addition, in the description of the embodiments of the present disclosure, unless otherwise clearly specified, the terms "provided", "connected with" and "connected to" should be understood in a broad sense. For example, the connection may be a fixed connection, a detachable connection or an integrated connection, may be a mechanical connection or an electrical connection, may be a direct connection or an indirect connection via a medium, or may be intercommunication between two components. Those of ordinary skill in the art may understand the specific meanings of the above terms in the present disclosure based on specific situations.

It should be noted that in the description of the present disclosure, the terms such as "center", "top", "bottom", "left", "right", "vertical", "horizontal", "inner" and "outer" indicate the orientation or position relationships based on the drawings. These terms are merely intended to facilitate description of the present disclosure and simplify the description, rather than to indicate or imply that the mentioned apparatus or element must have a specific orientation and must be constructed and operated in a specific orientation. Therefore, these terms should not be construed as a limitation to the present disclosure. Moreover, the terms "first", "second" and "third" are used only for the purpose of description, rather than to indicate or imply relative importance.

Finally, it should be noted that the above embodiments are merely used to explain the technical solutions of the present application, but are not intended to limit the present application. Although the present application is described in detail with reference to the foregoing embodiments, the person of ordinary skill in the art should understand that they can still modify the technical solutions described in the foregoing embodiments, or make equivalent substitutions on some or all technical features therein. These modifications or substitutions do not make the essence of the corresponding technical solutions deviate from the spirit and scope of the technical solutions of the embodiments of the present application.

INDUSTRIAL APPLICABILITY

The technical solutions of the present application can simplify the structure, reduce the footprint, and improve the overall sorting efficiency.

What is claimed is:

1. A piece picking system, comprising a main conveyor unit and a plurality of sorting modules, wherein the main conveyor unit and the plurality of sorting modules are arranged crosswise in a matrix, and the main conveyor unit is located above or below the plurality of sorting modules; a plurality of picking stations are arranged at a side of the main conveyor unit, and are adjacent to each of the plurality of sorting modules; the main conveyor unit is configured to convey a first container carrying an item to be picked; each of the plurality of picking stations is configured to pick the item in a required quantity from the first container conveyed by the main conveyor unit according to an order requirement; and each of the plurality of sorting modules is configured to sort the item picked by an adjacent picking station, wherein each of the plurality of sorting modules comprises a sorting track, a sorting cart and a plurality of bins; an order container corresponding to an order is placed in each of the plurality of bins; and the sorting cart moves on the sorting track to receive the item transferred from the picking station and dispatch the item to the order container in the corresponding bin, wherein the main conveyor unit is disposed directly above at least a subset of the plurality of bins, said subset of the plurality of bins including said corresponding bin.

2. The piece picking system according to claim 1, wherein the main conveyor unit comprises a main conveyor line and a staging line; the staging line is located at one or two sides of the main conveyor line; the first container is transferred to the staging line for each of the plurality of picking stations to pick the item in the required quantity; and a second container carrying a remaining item after picking is staged on the staging line or transferred to the main conveyor line to be taken away.

3. The piece picking system according to claim 2, wherein the main conveyor unit is provided with a lateral transfer device, and the lateral transfer device is configured to transfer the first container and the second container between the main conveyor line and the staging line.

4. The piece picking system according to claim 1, further comprising an auxiliary conveyor line, wherein the auxiliary conveyor line is configured to carry an emptied container away from the piece picking system.

5. The piece picking system according to claim 1, wherein each of the plurality of picking stations comprises an electronic display screen, and the electronic display screen is configured to display information of the item to be picked, such that a picker picks the item in the required quantity.

6. The piece picking system according to claim 1, wherein each of the plurality of picking stations comprises a manipulator connected to a host computer, and the manipulator is configured to pick the item in the required quantity according to a picking instruction issued by the host computer.

7. The piece picking system according to claim 1, wherein a transfer conveyor for transferring the item is provided at an adjoining position of each of the plurality of picking stations and each of the plurality of sorting modules.

8. The piece picking system according to claim 1, wherein the sorting track is a circular sorting track, and the circular sorting track is provided with a chute connected to the corresponding bin; the sorting cart circulates on the circular sorting track; and when the sorting cart carries the item to the corresponding bin, the item is slid into the order container of the corresponding bin through the chute at the corresponding bin.

9. The piece picking system according to claim 8, wherein each of the plurality of sorting modules is located below the main conveyor unit; and a long side of the circular sorting track crosses the main conveyor unit.

10. The piece picking system according to claim 1, further comprising a pick-up conveyor line and a transfer device, wherein the transfer device is configured to transfer a fulfilled order container to the pick-up conveyor line, and transport an empty order container to a vacant bin.

11. The piece picking system according to claim 1, further comprising an automated guided transfer device, wherein the automated guided transfer device is configured to take away a fulfilled order container, and transport an empty order container to a vacant bin.

12. The piece picking system according to claim 1, further comprising a first flow rack, wherein a third container carrying a fragile item to be sorted is transported to the first flow rack for manual sorting by a picker.

13. The piece picking system according to claim 1, further comprising a flow rack, wherein an abnormal fulfilled order container is transferred to the flow rack for manual adjustment by a picker.

14. The piece picking system according to claim 2, further comprising an auxiliary conveyor line, wherein the auxiliary conveyor line is configured to carry an emptied container away from the piece picking system.

15. The piece picking system according to claim 3, further comprising an auxiliary conveyor line, wherein the auxiliary conveyor line is configured to carry an emptied container away from the piece picking system.

16. The piece picking system according to claim 2, wherein each of the plurality of picking stations comprises an electronic display screen, and the electronic display screen is configured to display information of the item to be picked, such that a picker picks the item in the required quantity.

17. The piece picking system according to claim 3, wherein each of the plurality of picking stations comprises an electronic display screen, and the electronic display screen is configured to display information of the item to be picked, such that a picker picks the item in the required quantity.

18. The piece picking system according to claim 4, wherein each of the plurality of picking stations comprises an electronic display screen, and the electronic display screen is configured to display information of the item to be picked, such that a picker picks the item in the required quantity.

19. The piece picking system according to claim 2, wherein each of the plurality of picking stations comprises a manipulator connected to a host computer, and the manipulator is configured to pick the item in the required quantity according to a picking instruction issued by the host computer.

* * * * *